(12) United States Patent
Corghi (10) Patent No.: US 6,854,950 B2
(45) Date of Patent: Feb. 15, 2005

(54) LIFTING DEVICE FOR TIRE REMOVAL MACHINES

(75) Inventor: Remo Corghi, Correggio (IT)

(73) Assignee: Corghi S.p.A., Correggio (IT)

( * ) Notice: Subject to any disclaimer, the term of this patent is extended or adjusted under 35 U.S.C. 154(b) by 103 days.

(21) Appl. No.: 10/123,456

(22) Filed: Apr. 17, 2002

(65) Prior Publication Data

US 2002/0154983 A1 Oct. 24, 2002

(30) Foreign Application Priority Data

Apr. 24, 2001 (IT) .................................... RE2001A0042

(51) Int. Cl.[7] .............................................. B66C 9/00
(52) U.S. Cl. ..................................... 414/680; 414/917
(58) Field of Search ............................... 414/426, 428, 414/589, 590, 680, 917; 157/1.1, 19

(56) References Cited

U.S. PATENT DOCUMENTS 2,477,858 A    8/1949  Brabbin
2,903,049 A  *  9/1959  Carlson ........................ 157/19
3,847,294 A  * 11/1974  Davenport .................. 414/428

FOREIGN PATENT DOCUMENTS

EP           91202680.4          4/1992

* cited by examiner

*Primary Examiner*—Donald W. Underwood
(74) *Attorney, Agent, or Firm*—Browdy and Neimark, P.L.L.C.

(57) ABSTRACT

The tire removal machine comprises an upper member (15) which rigidly supports the rim of a wheel positioned coaxial to it, and is positioned at the top of a coaxial vertical rotary shaft (12) projecting upwards from a machine casing (11). The device of the invention comprises a support means (20) for supporting a wheel resting thereon, and transfer means for raising and lowering the support means (20) to move it from a first position, in which the means (20) is disposed close to the floor surface in order to receive/unload the wheel, to an upwardly raised position in which the wheel rests on said upper member (15), and vice versa.

14 Claims, 9 Drawing Sheets

LIFTING DEVICE FOR TIRE REMOVAL MACHINES

BACKGROUND OF THE INVENTION

1. Technical Field of the Invention

This invention relates to tyre removal machines comprising an upper member positioned at the top of a coaxial vertical rotary shaft which projects upwards from a machine casing, to rigidly support the rim of a wheel positioned coaxial to it.

2. Prior Art

The usual operations of this type of machine, aimed at removing a tyre from the wheel rim and mounting another tyre on the same wheel rim, are carried out on the wheel while positioned on said upper member. Said upper member is positioned at a height of 1–1.4 m from the floor, to enable the operator to comfortably operate on the wheel.

Currently, to mount the wheel on the upper member, the operator is obliged to lift it from the floor as far as the upper member using only muscular work, and likewise to return it to the ground. This not only results in considerable muscular fatigue but also involves time wastage.

An object of the present invention is to obviate said drawbacks.

OBJECT AND SUMMARY OF THE INVENTION

The invention is based on the fact of comprising a support means for supporting a wheel resting thereon, and transfer means for raising and lowering the support means to move it from a first position, in which this means is disposed close to the floor surface in order to receive a wheel, to an upwardly raised position in which the wheel rests on said upper member and vice versa.

Said transfer means comprise a lever mechanism, which at one end carries the support means and at its other end is hinged on a horizontal axis to a vertically movable element.

The support means comprises a first frame on which the radially most outer part of the wheel rests, and which has its central part empty to enable it to descend about the upper member without interfering with it, said frame being disposed in an inclined position when the support means is in said first position, and in a virtually horizontal position when the support means is raised above the upper member.

BRIEF DESCRIPTION OF THE DRAWINGS

The invention is described in detail hereinafter with the aid of the accompanying figures which illustrate one embodiment thereof by way of non-limiting example.

DETAILED DESCRIPTION OF THE PREFERRED EMBODIMENT(S) OF THE INVENTION

The tyre removal means shown, to which the device of the invention is applied, is of the known type and comprises a prismatic first casing 11 from which there emerges an upwardly extending vertical shaft 12, on the top of which there is positioned an upper member 15 arranged to rigidly support and rotate the rim D of a wheel R disposed with its axis vertical and coaxial with the shaft 12; the casing 11 contains in its interior the drive unit for rotating the shaft 12 and the drive units for the other machine members, which are applied to a second casing 13, positioned to the side of the first.

According to the invention, a lifting device (indicated overall by 1) is provided comprising essentially a support means 20 arranged to support a wheel resting on it, and transfer means for raising the support means 20 and with it the wheel R, and to cause it to rest on the upper member 15.

Said transfer means comprise a lever mechanism, which carries at one end the support means 20 and at its other end is hinged on a horizontal axis to a vertically movable element.

In particular, in the embodiment shown in the figures, said vertically movable element is defined by a slider element 31, movable vertically along vertical guide means fixed to one side of the machine casing from which the vertical shaft 12 projects. Drive means are provided at these guide means to move the slider element 31 between an upper and a lower position.

In the first embodiment (shown in FIGS. 1–4), the slider 31 is slidable along a vertical guide 32 and is rigidly connected to a member 33 slidable along a second vertical guide 34, to the side of the first. Said guides 32 and 34 are rigidly fixed to the side of the casing 11 and of the casing 13.

Said drive means is defined by a vertical cylinder-piston unit 35 positioned between the two guides 32 and 34, its rod being fixed to a crosspiece 36 rigid with the slider 31.

There is also provided a support arm 40 having one end hinged at 42, on a horizontal axis of rotation, to a bracket 41 fixed to the slider element 31. The movable end of the arm 40 carries the support means 20.

The support means 20 comprises a first frame 21, on which the radially most outer part (the tyre) of the wheel rests, and which is in an inclined position when the support means is in said first position and virtually horizontal when said support means is lifted onto the upper member 15.

The support means 20 also comprises a second frame 22 which lies virtually horizontal when the support means is in said first position, and on which the wheel tread rests.

According to the first embodiment, the frame 21 is formed from a U-bent bar 211, the ends of which are fixed to a horizontal transverse shaft 212 rigidly fixed to the end of the arm 40, to form a rectangular frame, which is internally hollow and of such dimensions as to enable it to descend about the upper member 15 without interfering with it. The second frame 22 is formed from a U-shaped bar 221, the ends of which are fixed to a crosspiece 222 which is pivoted on the shaft 212 on a horizontal axis of rotation.

The support arm 40 is made to rotate about the axis of the hinge 42 between a downwardly inclined position, which determines said first position of the support means 20, and an upwardly inclined position.

According to the first embodiment, the support arm 40 is rotated by a hydraulic cylinder-piston unit 45 connected between an intermediate point of the arm 40 and the slider element 31.

The transfer means (31, 32, 34, 35, 40, 45) are disposed to the side of the machine casing 11 from which the vertical shaft 12 projects, while the support means 20 extends transversely to the side of the arm 40, to lie to the front of the casing 11 when in its first position (see FIG. 4 in particular), and above it when in its raised position respectively.

Figure 1:
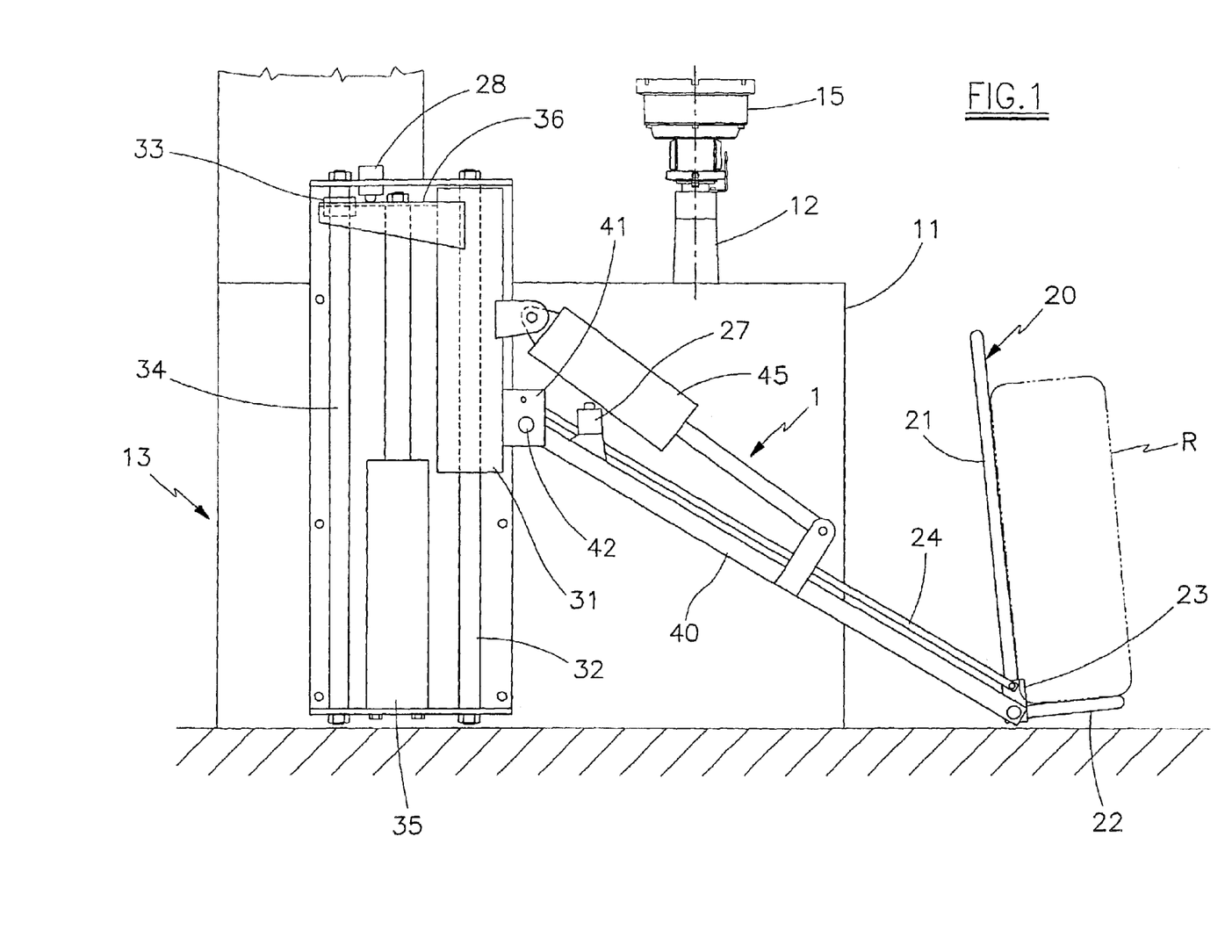
FIG. 1 is a vertical side elevation of a first embodiment of the lifting device of the invention applied to a tyre removal means and shown in said first position for loading/unloading.
Figure 2:
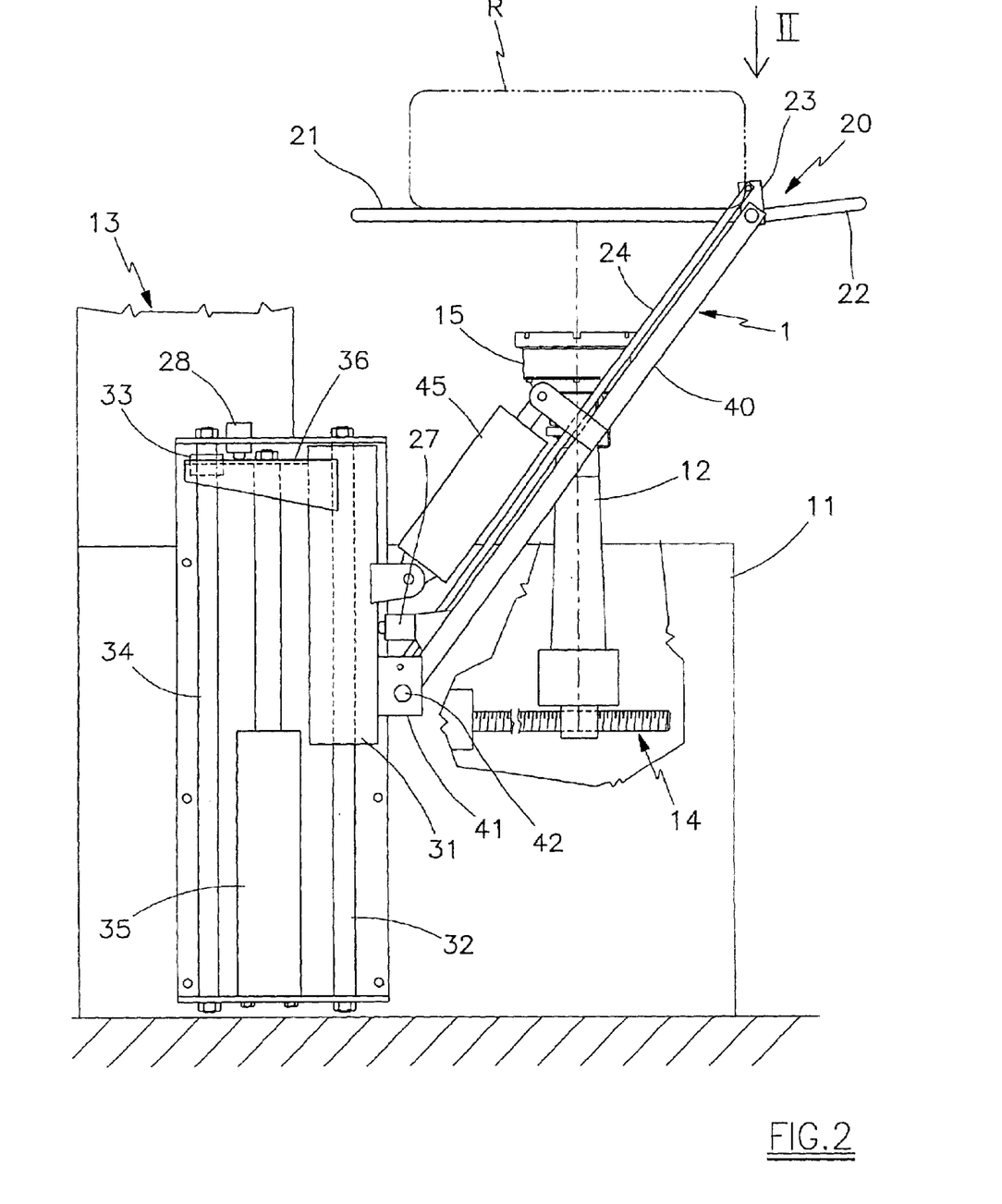
FIG. 2 is the same view as FIG. 1, shown in a stage subsequent to this latter, in which the support means has been raised into its position of maximum height.
Figure 2A:
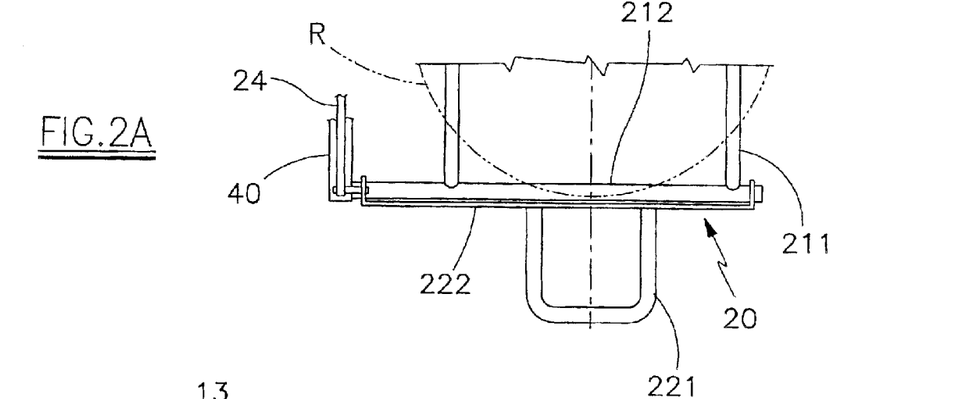
FIG. 2A is an enlarged detail seen in the direction of the arrow II of FIG. 2.
Figure 3:
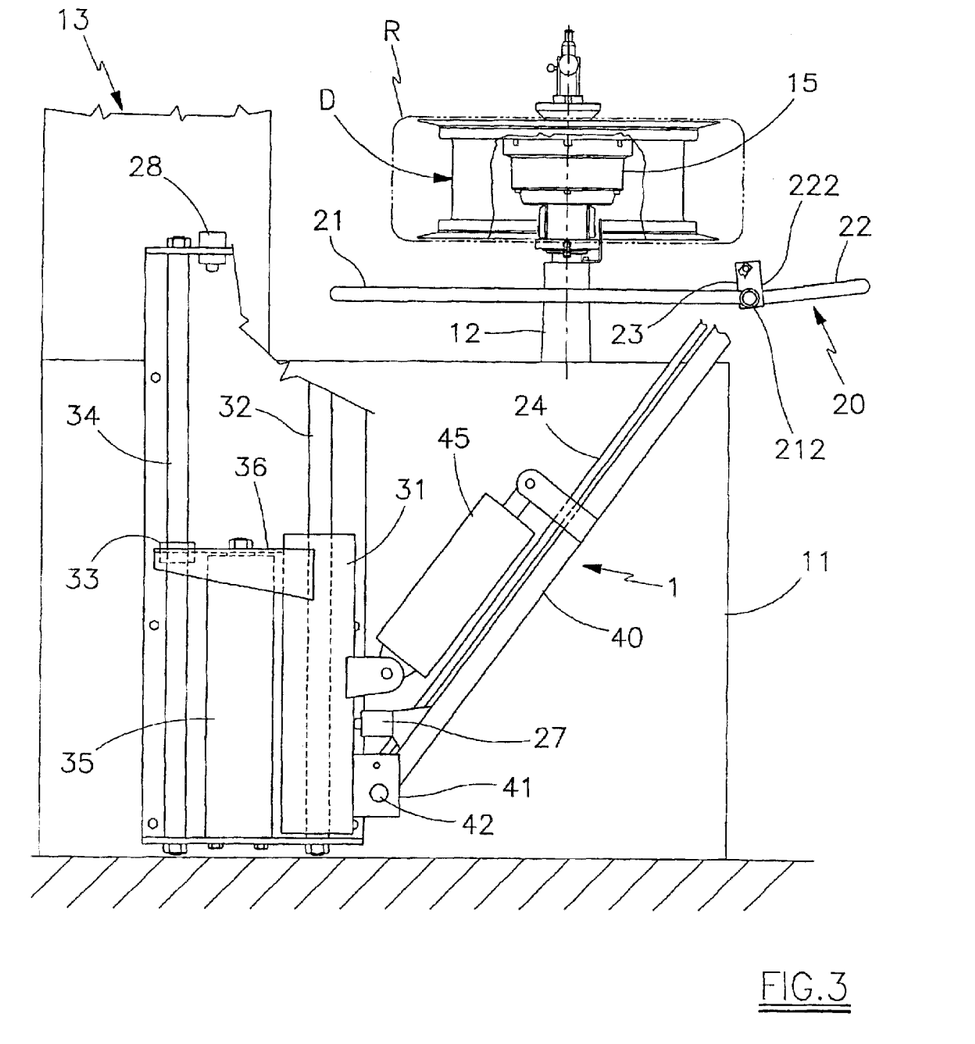
FIG. 3 is the same view as FIG. 2, shown in a stage subsequent to this latter in which the support means has been lowered onto the machine body, into its lower minimum position.
Figure 4:
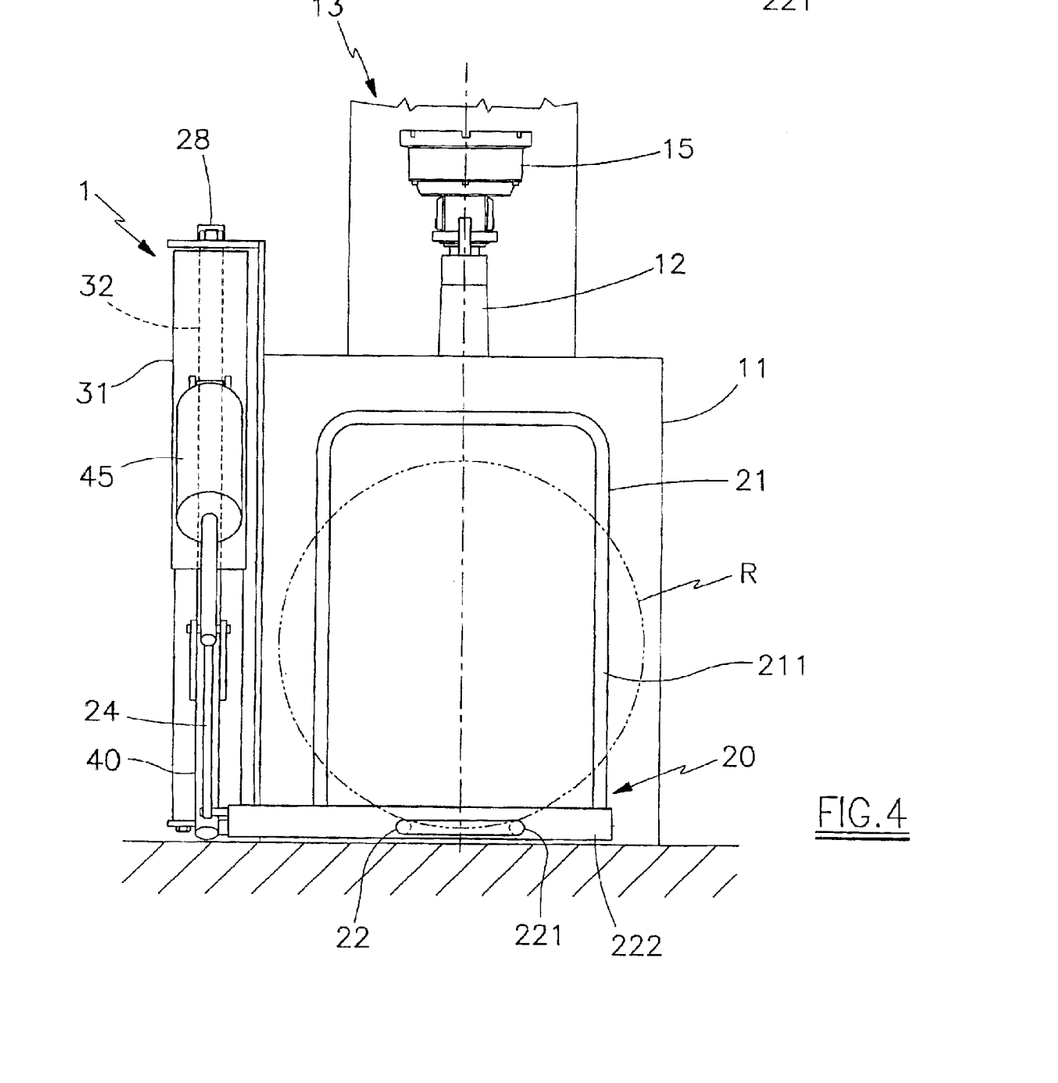
FIG. 4 is a front view of FIG. 1.
Figure 5:
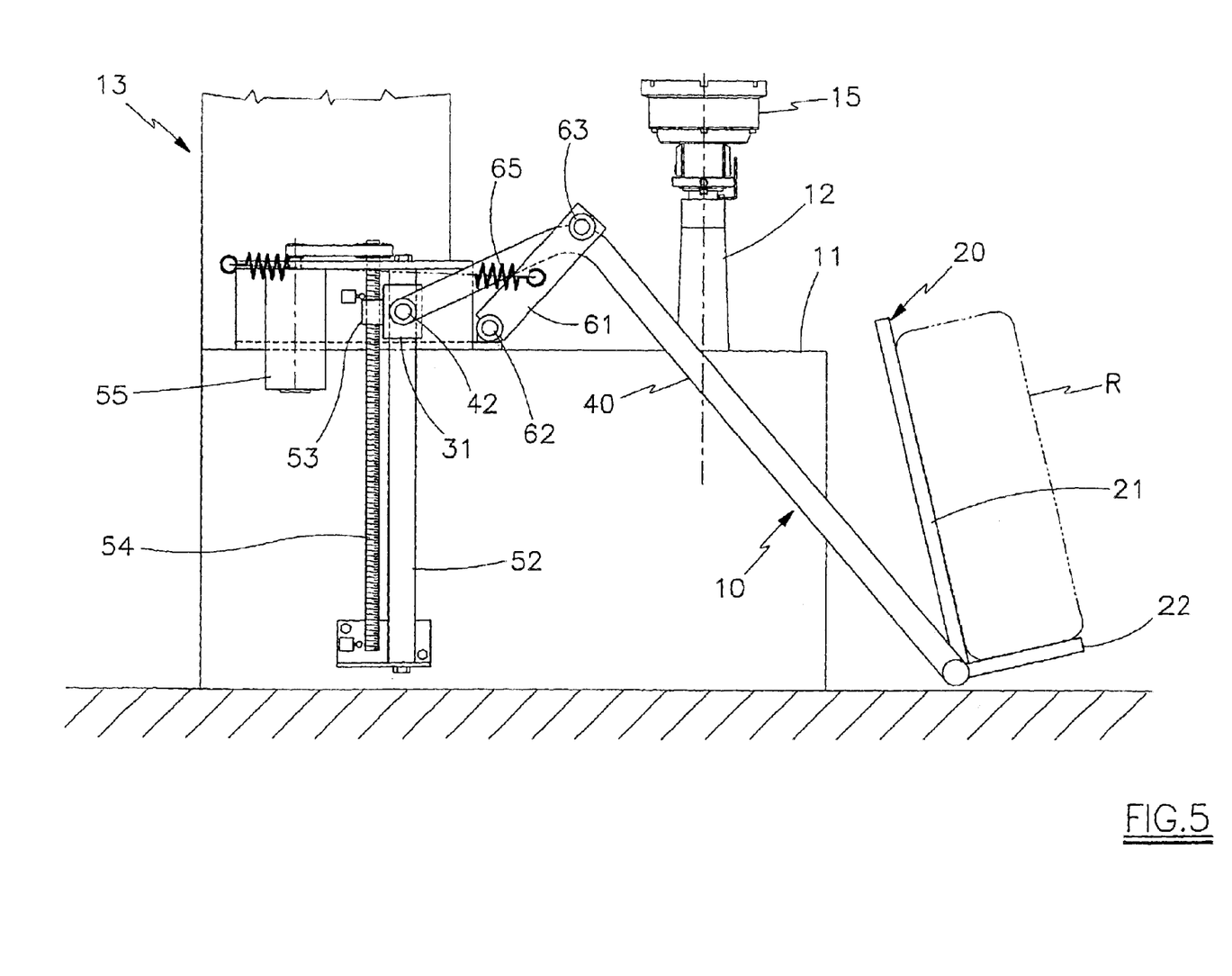
FIG. 5 is a vertical side elevation of a second embodiment of the lifting device of the invention applied to a tyre removal means and shown in said first position for loading/unloading.
Figure 6:
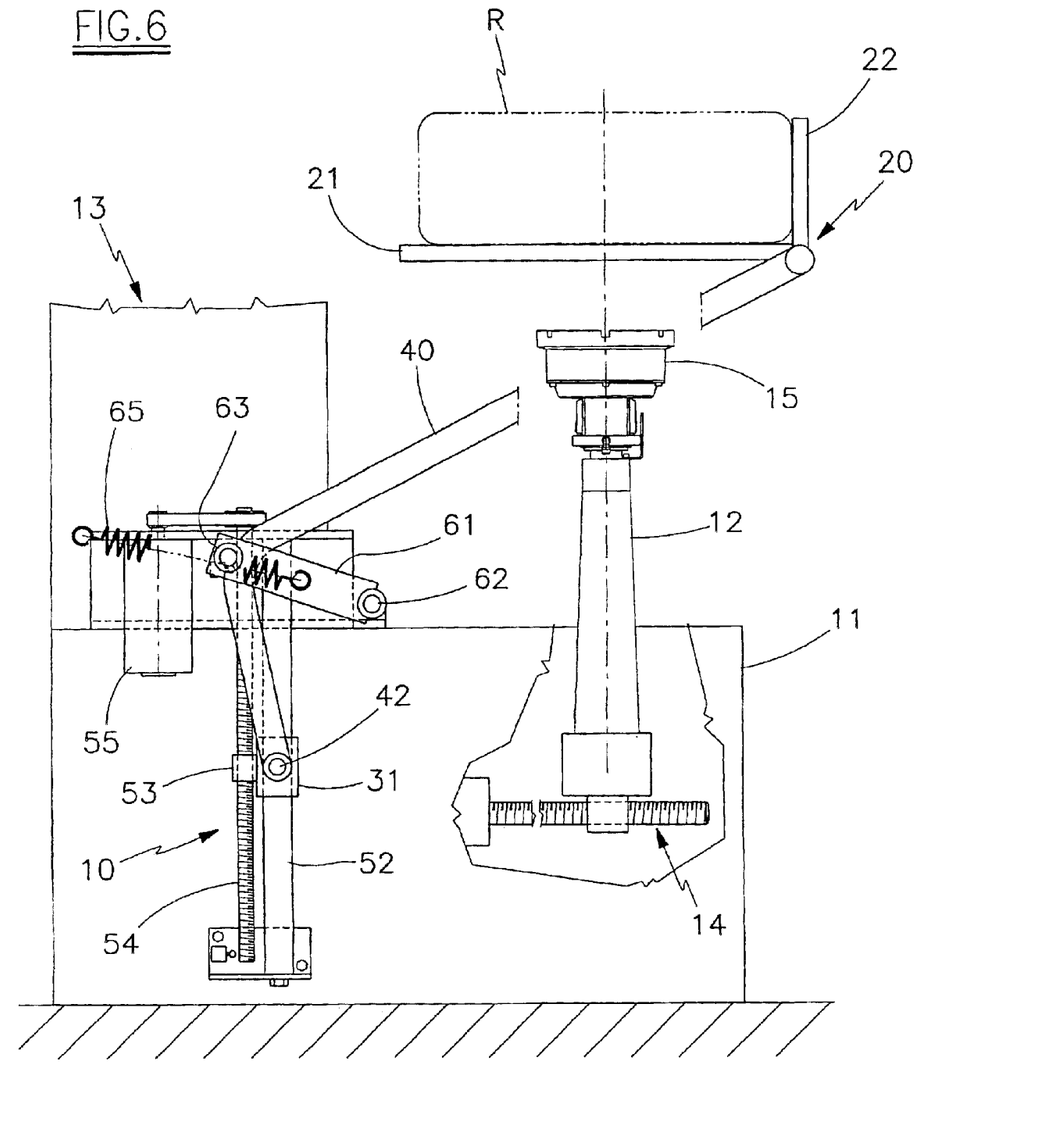
FIG. 6 is the same view as FIG. 5, shown in a stage subsequent to this latter in which the support means has been raised into its position of maximum height.
Figure 7:
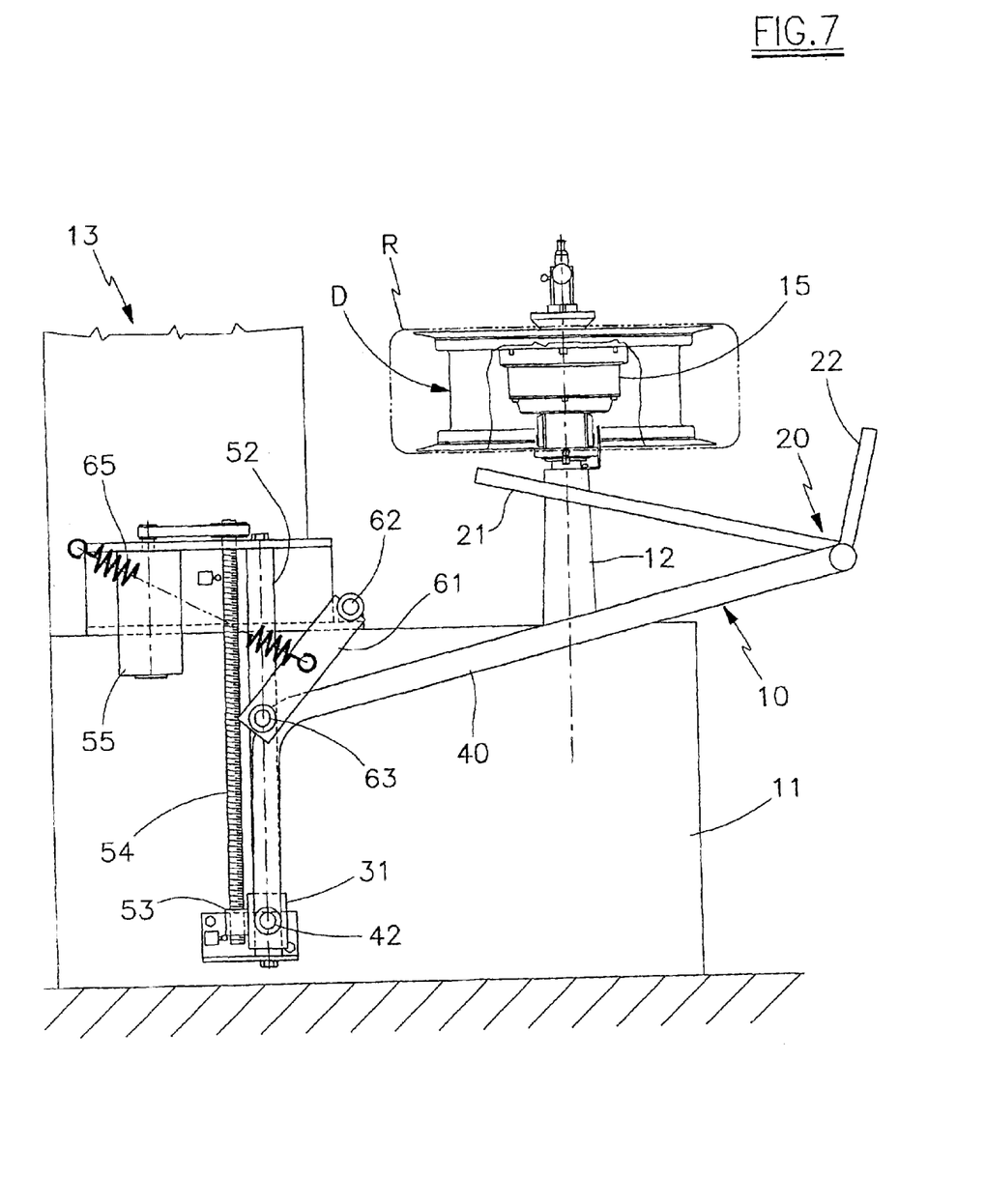
FIG. 7 is the same view as FIG. 6, shown in a stage subsequent to this latter in which the support means has been lowered onto the machine body, into its lower minimum position.
Figure 8:
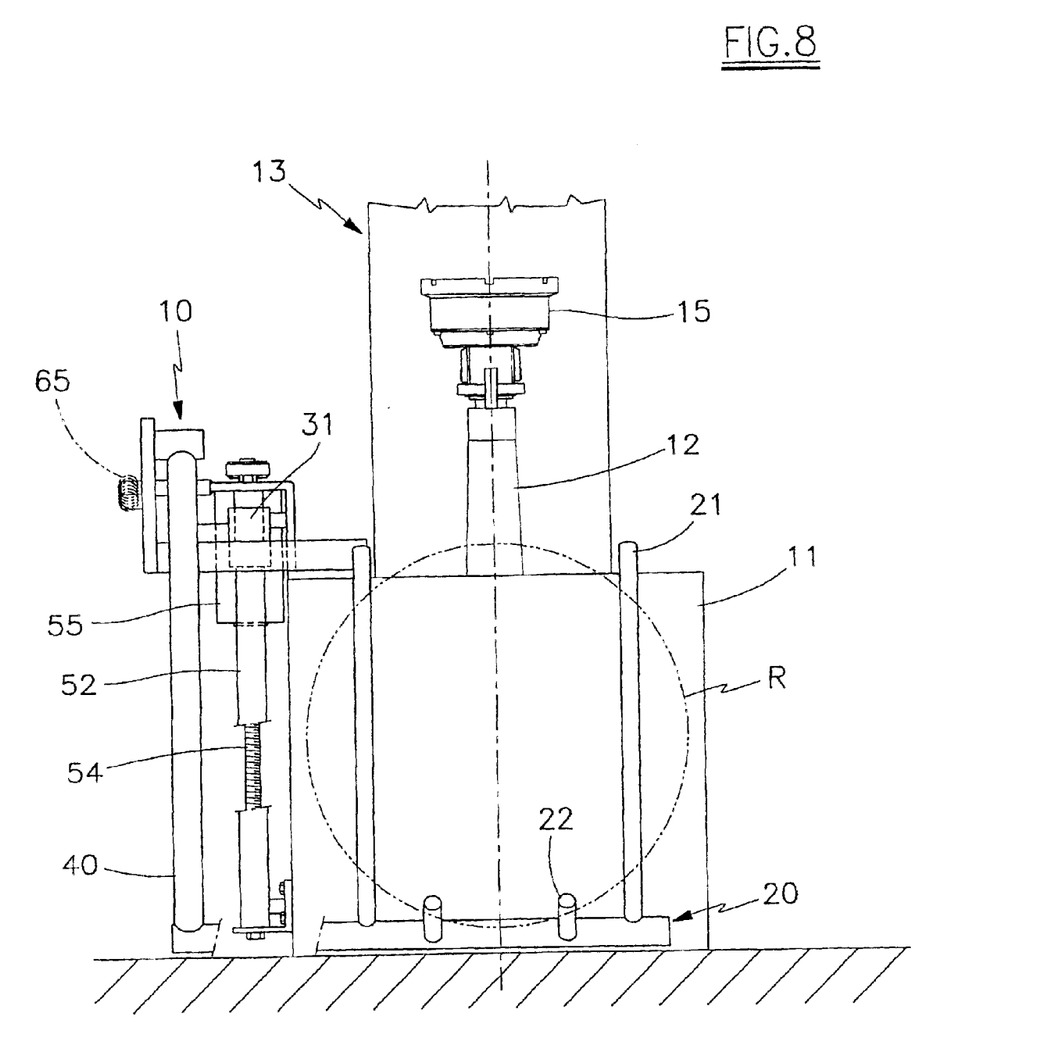
FIG. 8 is a front view of FIG. 5.

When the device 1 is in the position for loading/unloading the wheel R (first position) the slider element 31 is at rest in its upper end position; the support arm 40 is inclined downwards so that its free end is close to the floor (see FIG. 1). The first frame 21 is in a slightly inclined position, the second frame 22 being virtually horizontal and at a short distance from the floor. In this position, the operator can easily roll the wheel R onto the frame 22, to rest laterally against the frame 21 (as shown in FIG. 1).

At this point, on command, the device 1 executes a wheel lifting cycle. By firstly rotating the arm 40 upwards, it reaches its upper maximum position after slightly less than 90 degrees, in which the first frame 21 is disposed substantially horizontal, and the wheel R is disposed virtually coaxial with the axis of the upper member 15 (see FIG. 2 in particular). At this point the wheel can be shifted manually on the frame 21 to position it exactly coaxial, or alternatively the shaft 12 can be adjusted in the horizontal plane for the same purpose, it being provided for other purposes with means for translating it in a horizontal longitudinal direction (see FIG. 2).

When the arm 40 reaches its position of maximum inclination, the slider 31 is moved into its lower end position, causing the support means 20 to descend and leave the wheel R resting on the upper member 15, the means 20 finally being moved below the wheel R so that the means 20 does not hinder the rotation of the wheel or the other operations to be carried out with the tyre removal means.

The device also operates in the reverse direction, to reload the wheel R positioned on the upper member 15 after its change of tyre, and to lower it into said first position, where it is unloaded manually from the support means 20.

Preferably, the frame 21 has dimensions greater than the usual wheel rims, so that the wheel rests on it only via its tyre, to prevent damage to the wheel rim due to contact with the frame.

The device 1 preferably comprises usual control means for automatically executing the entire wheel lifting cycle on manual command, and the same for the reverse cycle for wheel unloading. For example, a first microswitch 27 is provided rigid with the arm 40, to make contact with the slider 31 when the arm 40 reaches its maximum upward inclination (maximum height of the support means 20) (FIG. 2), and undergo activation and cause the slider 31 to descend. There is also provided a second microswitch 28 located in a fixed position at the upper ends of the guides 32 and 34, to be operated by the crosspiece 36 when the slider 31 returns to its upper end position, to halt the descent of the arm 40 when activated.

According to the first embodiment, to one end of the crosspiece 222 of the second frame 22 there is fixed a lever 23 to which one end of a rod 24, parallel to the arm 40, is hinged, its other end being hinged to the bracket 41; the rod 24, together with the support arm 40, the bracket 41 and the lever 23, defines an articulated quadrilateral which maintains the lever 23, and hence the second frame 22, in a position constantly parallel to itself, i.e. substantially horizontal during rotation of the support arm 40. This means that when the support means 20 is in its lowered position on the casing 11, the second frame 22 is horizontal and relatively far from the wheel R positioned on the upper member 15.

The second embodiment, illustrated in FIGS. 5–8, differs from the first mainly in the means for driving the slider 31 and the support arm 40.

The slider 1 is slidable along a vertical guide 52 fixed rigidly to the side of the casing 11 and of the casing 13, and is made to slide in a vertical direction by a lead nut 53 rigid with the slider and engaged with a long vertical screw 54, which is parallel to the guide 52 and is rotated by an electric motor 55.

The support arm 40 is hinged not only to the slider 31 (by the hinge 42), but also, at an intermediate point thereon, to the movable end of a lever 61 which has its stationary end hinged at 62 to the top 62 of the first casing 11 and rotatable through a large angle about the hinge 62.

When the device 1 is in the position for loading/unloading the wheel R the slider element 31 is disposed in its upper end position; the support arm 40 is shaped and inclined downwards, so that its free end lies close to the floor (see FIG. 1). The first frame 21 of the support means 20 lies in a slightly inclined position and the second frame 22 lies virtually horizontal at a short distance from the floor. In this position, the operator can easily roll the wheel R onto the frame 22, to rest laterally against the frame 21.

At this point, on command, the motor 55 is operated in the direction to cause the slider 31 to translate downwards, the device 1 then executing a wheel lifting cycle. This cycle is completely executed during the translation of the slider 31 between its upper end position and its lower end position.

This latter, by moving the hinge point 42 downwards, causes the lever 61 to rotate, hence moving the second hinge 62, the arm 40 then following the position determined by the combination of the positions of the hinges 42 and 62. During the first part of the stroke of the slider 31, the arm 40 rotates upwards, and after slightly less than 90 degrees reaches its upper maximum position, in which the frame 21 is disposed substantially horizontal, and the wheel R is disposed virtually coaxial with the axis of the upper member 15 (see FIG. 6 in particular). Subsequently, continuing the downward stroke of the slider 31, the lever 61 is further rotated downwards, the arm 40 consequently being lowered so that the support means 20, after leaving the wheel R resting on the upper member 15, is moved below the wheel R so that it does not hinder the rotation of the wheel or the other operations to be carried out with the tyre removal means.

By rotating the screw in the reverse direction, the slider 31 travels upwards and the device 1 operates in the reverse sense, to reload the wheel R positioned on the upper member 15 after its change of tyre, and to lower it into said first position, where it is unloaded manually from the support means 20.

A spring 65 pulling the lever 61 is also provided, it being under maximum tension when the arm 40 is in the first position, so that its reaction aids the starting torque of the motor 55.

According to the second embodiment, the two frames 21 and 22 of the support means 20 are both of "comb" form and are both rigidly fixed to the movable end of the support arm 40.

Figure 9:
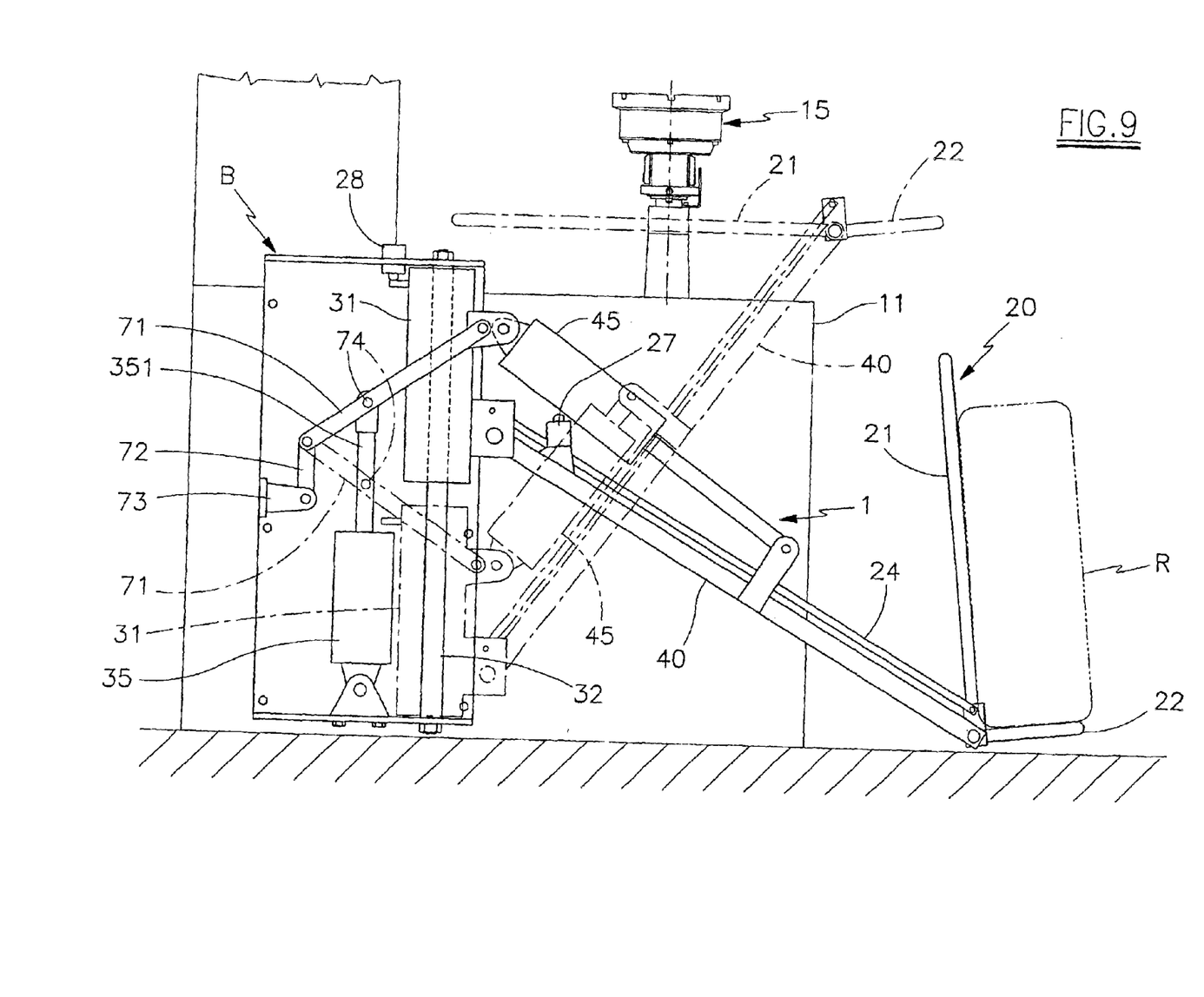
FIG. 9 is a vertical side elevation of a variant of the first embodiment of the lifting device of the invention.

FIG. 9 shows a variant of the first embodiment of the lifting device of the invention. This variant differs from the first embodiment in that the cylinder-piston unit 35 for vertically moving the slider 31 acts thereon via a crank which amplifies the movements of the piston rod 351. Specifically, one end of a lever 71 is hinged to the slider 31, its second end being hinged to a second lever 72 itself hinged to a bracket 73. The upper end of the rod 351 is pivoted on a pin 74 to an intermediate point on the first lever 71.

By virtue of the described crank system 71–74, the stroke of the rod 351 is reduced, with consequent reduction in the length of the entire cylinder-piston unit; this makes it possible to reduce the height of the unit, indicated overall by B in FIG. 9, which comprises the slider 31 and its guide and operating members.

Said reduction is particularly advantageous in preventing the unit B from interfering with the movements of the first frame 21, particularly when the machine operates on large-dimension wheels.

Numerous modifications of a practical and applicational nature can be made to the device of the invention, but without departing from the scope of the inventive idea as defined by the appended claims.

What is claimed is:

1. A tire removal machine for use on a floor surface comprising,
   an upper member (15) adapted to support the rim of a wheel in a coaxial position with the upper member, said upper member (15) being coaxially positioned at a top of a rotatable vertical shaft (12) projecting upwards from a machine casing (11),
   a lifting device having support means (20) for supporting the wheel resting thereon, and
   transfer means for raising, rotating and lowering the support means (20) from a first position, in which the support means (20) is disposed close to the floor surface to permit receiving or unloading the wheel when an axis thereof is positioned substantially horizontal to the floor surface to an upwardly raised second position on which the wheel is adapted to rest on said upper member (15) where the axis thereof is positioned vertically to the floor surface, and back from the second position to the first position
   wherein said transfer means has a lever mechanism, on which at a first end thereof carries the support means (20) and at a second end thereof is hinged on a horizontal axis of a slider element (31) which moves perpendicular to the floor surface and
   drive means (35, 55) for moving the slider element (31) between an upper and a lower position.

2. The tire removal machine according to claim 1, wherein the transfer means is located to a side of the machine casing (11) from which the vertical shaft projects, the support means (20) projecting outwards from the transfer means so that when in the first position the support means is located in front of the casing (11), and when in the second position the support means is located above the casing (11).

3. The tire removal machine according to claim 2, wherein the support means (20) has a first frame (21) on which a side of the wheel can rest, and an empty central part to enable the support means to move towards the upper member (15) without interference, said first frame (21) being located in an inclined position when the support means (20) is in the first position, and in a substantially horizontal position when the support means (20) is raised to the second position above the upper member (15).

4. The tire removal machine according to claim 3, wherein the support means comprises a second frame (22) which is substantially horizontal to the floor surface when the support means is in a first position, and on which the tread of the wheel is adapted to rest.

5. The tire removal machine according to claim 1, wherein
   said slider element (31) is movable along vertical guide means (32, 34, 52) located at a side of the machine casing (11) from which the vertical shaft (12) projects, and wherein said transfer means further comprises;
   a support arm (40) having a first end hinged on a horizontal axis of the slider element (31), and a movable second end carrying the support means (20),
   means (45, 61) for rotating the support arm (40) about the axis of a hinge (42) between a downwardly inclined position, which determines the first position of the support means (20), and an upwardly inclined position,
   said slider element (31) being disposed in the upper position thereof when the support arm (40) is inclined downwards, and moved into the lower position thereof, after the support arm (40) has been inclined upwards, in order to lower the support means (20) below the upper member (15).

6. The tire removal machine according to claim 5, wherein said support arm (40) is rotated by a hydraulic cylinder-piston unit (45) connected to the support arm (40) and to the slider element (31).

7. The tire removal machine according to claim 5, wherein said support arm (40) is also hinged, at an intermediate point thereof, to the end of a rotary lever (61).

8. The tire removal machine according to claim 5, wherein the support means (20) has a first frame (21) on which a side of the wheel is adapted to rest and which is rigidly fixed to the movable second end of the support arm (40), and a second frame (22) on which the tread of the wheel is adapted to rest and which is pivoted to the movable second end of the support arm (40) and
   a rod (24) parallel to the support arm (40), which together with the support arm (40) defines an articulated quadrilateral which maintains the second frame (22) in a substantially horizontal position to the floor surface during rotation of the support arm (40).

9. The tire removal machine according to claim 5, wherein the support means (20) comprises a first frame (21) on which a side of the wheel is adapted to rest and which is rigidly fixed to the movable second end of the support arm (40), and a second frame (22) on which the tread of the wheel is adapted to rest also rigidly fixed to the movable end of the support arm (40).

10. The tire removal machine according to claim 5, wherein said drive means (35) for moving the slider element (31) between the upper and the lower position thereof has a hydraulic cylinder-piston unit (35), the rod (351) of which acts on the slider (31) via a crank system (71–74) which amplifies the movements of the rod (351).

11. A tire removal machine for use on a floor surface comprising, an upper member (15) adapted to support the rim of a wheel in a coaxial position with the upper member, said upper member (15) being coaxially positioned at a top of a rotatable vertical shaft (12) projecting upwards from a machine casing (11), a lifting device having support means (20) for supporting the wheel resting thereon, and transfer means for raising, rotating and lowering the support means (20) from a first position, in which the support means (20) is disposed close to the floor surface to permit receiving or unloading the wheel when an axis thereof is positioned substantially horizontal to the floor surface to an upwardly raised second position on which the wheel is adapted to rest on said upper member (15) where the axis thereof is positioned vertically to the floor surface, and back from the second position to the first position, wherein said transfer means has a lever mechanism, on which at a first end thereof carries the support means (20) and at a second end thereof is hinged on a horizontal axis of a movable element (31) which moves perpendicular to the floor surface.

12. The tire removal machine according to claim 11, wherein the transfer means is located to a side of the machine casing (11) from which the vertical shaft projects, the support means (20) projecting outwards from the transfer means so that when in the first position the support means is located in front of the casing (11), and when in the second position the support means is located above the casing (11).

13. The tire removal machine according to claim 12, wherein the support means (20) has a first frame (21) on which a side of the wheel can rest, and an empty central part to enable the support means to move towards the upper member (15) without interference, said first frame (21) being located in an inclined position when the support means (20) is in the first position, and in a substantially horizontal position when the support means (20) is raised to the second position above the upper member (15).

14. The tire removal machine according to claim 13, wherein the support means comprises a second frame (22) which is substantially horizontal to the floor surface when the support means is in a first position, and on which the tread of the wheel is adapted to rest.

* * * * *